United States Patent [19]

Parquet et al.

[11] 4,030,560

[45] June 21, 1977

[54] HYDRAULIC SKID STEERING CONTROL SYSTEM

[75] Inventors: Donald J. Parquet; Carl O. Pedersen, both of Burlington, Iowa

[73] Assignee: J. I. Case Company, Racine, Wis.

[22] Filed: Mar. 29, 1976

[21] Appl. No.: 671,627

[52] U.S. Cl. .............................. 180/6.48; 60/571; 60/588; 180/77 R
[51] Int. Cl.² ...................................... B62D 11/04
[58] Field of Search ............. 180/6.48, 77 R, 77 H, 180/77 HT; 60/533, 571, 572, 585, 588; 244/78; 251/57

[56] References Cited

UNITED STATES PATENTS

| | | | |
|---|---|---|---|
| 1,716,121 | 6/1929 | Giffen | 251/57 X |
| 2,540,879 | 2/1951 | Hebel et al. | 60/572 |
| 2,605,852 | 8/1952 | Rhoads | 60/533 |
| 3,837,417 | 9/1974 | Little | 180/6.48 |
| 3,888,323 | 6/1975 | Patton | 180/6.48 |

FOREIGN PATENTS OR APPLICATIONS

| | | | |
|---|---|---|---|
| 1,332,579 | 6/1963 | France | 60/571 |

*Primary Examiner*—Joseph F. Peters, Jr.
*Assistant Examiner*—John A. Pekar
*Attorney, Agent, or Firm*—Dressler, Goldsmith, Clement, Gordon & Shore, Ltd.

[57] ABSTRACT

A control system for connecting a manually actuated lever to an arm of a fluid translating device that forms part of the drive transmission for a skid steer vehicle is disclosed herein. The connection between the lever and the arm is in the form of a hydraulic fluid connection that includes master and slave cylinder and piston assemblies with the master cylinder and piston assembly connected to the lever and the slave cylinder and piston assembly connected to the control arm. The opposite ends of the respective cylinders on opposite sides of the respective pistons are interconnected by fluid conduits to define first and second chambers and both pistons are biased to a centered neutral position. The system also incorporates a hydraulic fluid reservoir that is connected to the master cylinder by ports located in close proximity to the master piston when it is in a neutral position so that any fluid losses in either cylinder are automatically replenished when the master piston is returned to the neutral position.

7 Claims, 2 Drawing Figures

HYDRAULIC SKID STEERING CONTROL SYSTEM

BACKGROUND OF THE INVENTION

Numerous vehicles of the track or wheel type to perform various material handling operations have been proposed. One type of vehicle that recently has received a remarkable degree of attention is a small unit that incorporates four wheels which are driven by two separate power sources and the steering or turning movement is accomplished by driving the pair of wheels on one side of the vehicle in one direction while the second pair of wheels is either in a neutral condition or driven in the opposite direction. These vehicles have generally been referred to as skid steer vehicles.

One type of skid steer vehicle that is presently commercially available incorporates hydraulically actuated fluid translating devices as the power train between the engine and the respective pair of wheels. In order to simplify the construction and reduce the cost of the vehicles of this type, the actuation of the fluid translating devices is controlled through manual control levers that respectively cooperate with the two translating devices on opposite sides of the vehicle and the fluid translating devices are maintained in engagement by manual forces applied to the control levers.

In the past, it has been customary to interconnect the manual control levers and the respective fluid control devices through a mechanical linkage means. While the direct mechanical linkage connection provides a satisfactory interconnecting means between the control lever and the control arm on the fluid translating device, several problems are inherent with such an arrangement. One of the problems encountered is the fact that in small vehicles, particularly of the type under consideration, it is difficult to position the control levers in a position where they are readily accessible to the operator and still provide a simplified connection between the control lever and the arm. Usually, the areas in which the linkages must be located are very congested which makes it difficult to provide such mechanical connections. Furthermore, for safety reasons, it is essential that the control system automatically be returned to the neutral condition when the levers are released.

The mechanical linkage interconnection has an additional disadvantage in that the direct linkage connection results in considerable vibration and shock being transmitted to the control lever which is disagreeable to the operator and results in substantial wear of the various parts.

While various alternate types of interconnections have been proposed to be substituted for the linkage connection, these types of connections have not found any large degree of commercial success, particularly in the small vehicles of the type under consideration, primarily because of the expense and complexity for such systems.

SUMMARY OF THE INVENTION

According to the present invention, there is provided an extremely simplified hydraulic interconnection between a manually actuated control lever and an arm of a fluid translated device which drives a pair of wheels on one side of a skid steer vehicle. The system is designed so that the hydraulic fluid is at atmospheric pressure any time the control system is moved to a neutral position. Also, the control system is automatically moved to a neutral position each time the control lever is released and the system is designed to replenish the loss of any hydraulic fluid in the system each time the control lever is returned to the neutral position.

More specifically, according to the present invention, there is provided a control system between a manual control lever and a control arm that is part of a fluid translating device with the control system incorporating a master piston and cylinder assembly and a slave piston and cylinder assembly that respectively have opposite ends interconnected by conduits to define first and second hydraulic chambers respectively located on opposite sides of the respective pistons and each chamber incorporates a portion of each of the two cylinders. The respective pistons are always biased to centered neutral position wherein the pistons are located substantially equal distances from opposite ends of the respective cylinders. A fluid reservoir is connected to one of the cylinders by ports that are located in close proximity to opposite sides of the associated piston when it is in a neutral position. Whenever the control lever is actuated, one of the ports is immediately closed to trap the fluid within the associated chamber and, therefore, any further movement of the control lever will result in a transfer of the incompressible hydraulic fluid between the two cylinders so that the slave piston is automatically moved as a direct function of the movement of the master piston.

The unique advantage of the control system is that the manual control lever is always returned to the centered neutral position and both of the pistons are likewise returned to this position with the fluid reservoir automatically being connected to both of the chambers in the centered neutral position so that both pistons will automatically be positioned in the same position when the vehicle is in a neutral condition. This greatly simplifies the required synchronization of the respective cylinders to insure that a given movement of the control lever will result in the same amount of movement of the control arm.

Preferably, both of the cylinders are substantially identical in size and construction and are interchangeable so that the movement of the slave piston is directly correlated to the movement of the master piston.

DETAILED DESCRIPTION

Figure 1:
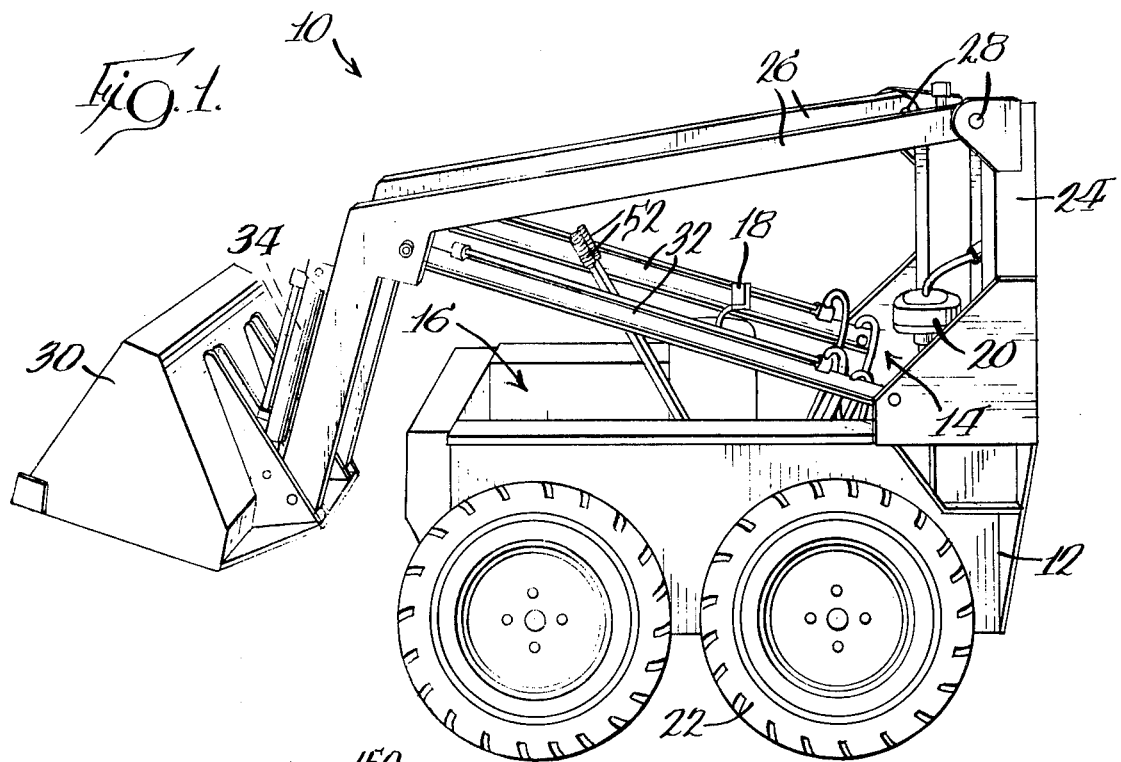
FIG. 1 is a perspective view of a vehicle having the control system of the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows a skid steer vehicle, generally designated by the reference numeral 10, having the present invention incorporated therein. Vehicle 10 consists of a frame or body 12 that has an engine space 14 adjacent the rear end thereof and a forward space 16 adjacent the forward end thereof with a seat 18 located intermediate the ends. An engine 20 is located in engine space 14 while forward space 16 is designed for the operator's legs.

The vehicle further includes first and second pairs of ground engaging members or wheels 22 (only one pair being shown) respectively located in opposite sides of vehicle body 12. Stanchions 24 project upwardly from the body on each side of the engine space and a lift arm 26 is pivotally secured by a pin 28 to the upper end of each stanchion. The lift arms project forwardly along the body and downwardly adjacent the forward end of the body with a material handling implement, such as a bucket 30, pivotally connected to the lower forward ends of the respective lift arms.

Hydraulic fluid rams 32 are positioned between each stanchion and its associated lift arm so that the lift arms may be raised and lowered on the vehicle body. Also, hydraulic fluid rams 34 are located between the material handling implement and the lift arms to pivot the material handling member or bucket 30 on the outer ends of the lift arms.

Figure 2:
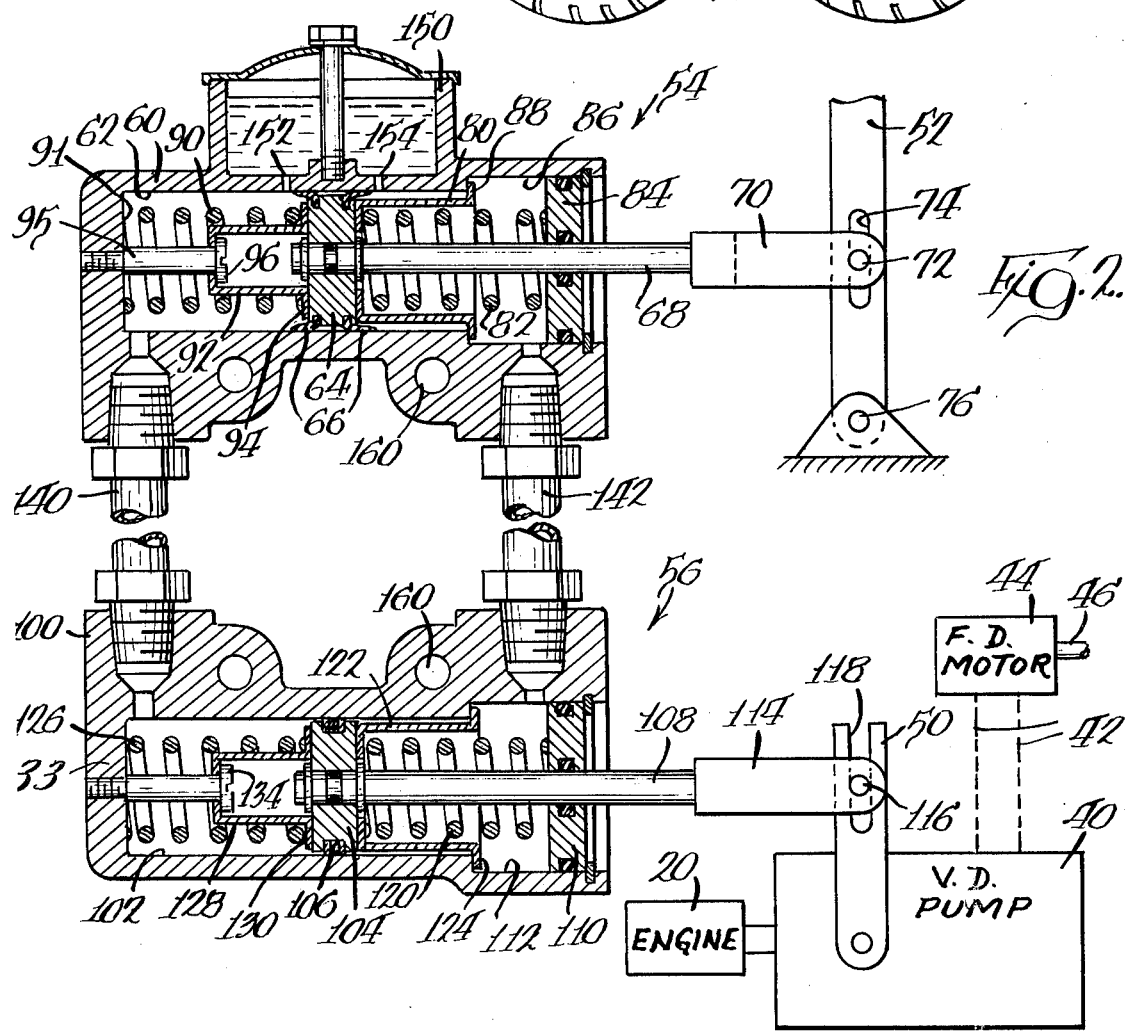
FIG. 2 is a view, partly in section, showing the interconnection between the control lever and the movable control arm forming part of a fluid translating device.

Each pair of wheels on the respective sides of the vehicle is driven through separate power trains which are indentical in construction and only one will be described in detail. As shown in FIG. 2, the power train between the engine and an associated pair of wheels consists of a fluid translating device or variable displacement pump 40 that is driven by engine or prime mover 20 and also supplies fluid under pressure through conduits 42 to fixed displacement motor or fluid translating device 44. The fluid translating device 44 has its output shaft 46 connected to the respective wheels 22 on one side of the vehicle through a suitable chain (not shown) located in a side compartment that forms part of vehicle body 12.

Variable displacement pump or fluid translating device 40 has a member or actuating arm 50 that is movable in opposite directions from a neutral position to supply hydraulic fluid under pressure from a source through either of the conduits 42 to propel the wheels on one side of the vehicle in either the forward or the reverse direction. This is accomplished by manual control levers 52 that are pivotally supported on body 12 and are respectively connected to the respective control arms 50 that form parts of the respective power trains for opposite sides of the vehicle.

According to the present invention, manual control level 52 and arm 50 of fluid translating device 40 are interconnected by a hydraulic connection which is extremely simple in construction and yet is very reliable for accurately positioning the control arm as a function of the position of the manual control lever.

FIG. 2 shows the details of the control system which includes a master cylinder and piston assembly 54 and a slave piston and cylinder assembly 56. Master piston and cylinder assembly 54 consists of a housing 60 that has an internal bore 62 which slidably supports a piston 64 that has sealing elements 66 on opposite edges which are in sealing enegagement with bore 62. Piston 64 is connected to lever 52 through a piston rod 68 that has a clevis 70 at the outer end thereof which supports a pin 72. Pin 72 extends through an elongated slot 74 in control level 52 which is pivoted about a fixed support by pin 76. Piston 64 has biasing means cooperating therewith that normally maintains the master piston in a centered neutral position intermediate opposite ends of master cylinder 60. In the illustrated embodiment, the master piston biasing means consists of a cap 80 that receives one end of a spring 82, the opposite end of which engages a plug 84 that is secured in sealing relation to an enlarged portion 86 defined on one end of bore 62. Cup 80 has an outwardly directed flange 88 that is received into enlarged portion 86 of bore 62 so that movement of piston 64 to the right as viewed in FIG. 2 will move cup 80 to the right and compress spring 82.

The first biasing means also includes a second spring 90 that cooperates with the opposite side of piston 64 and has one end in engagement with an end 91 of bore 62. A second cup 92 has an outwardly directed flange in engagement with piston 64 and spring 90 is telescoped over cup 92 and has an end in engagement with flange 94. A bolt 95 is threaded into the end 91 of housing 60 and has a head 96 that is located within cup 92. The bolt guides cup 92 during movement thereof. Also. cups 80 and 92 during movement thereof. Also, cups 80 and 92 along with plug 84 and end 91 act as stops defining respective extreme positions for piston 64 and these extreme positions are located a substantial distance from the respective ends of bore 62.

Slave cylinder and piston assembly 56 is substantially identical in construction and size to master slave and piston assembly 54 and again includes a housing 100 having a bore 102 with a piston 104 slidable in bore 102 and having a seal 106 in engagement with the surface of bore 102. Slave piston 104 has a piston rod 108 connected thereto which extends through a plug 110 that is received in an enlarged portion 112 on one end of bore 102. The outer end of piston rod 108 has a clevis 114 secured thereto with a pin 116 extending between the arms of clevis 114 and received in an elongated slot 118 in control arm 50.

Piston 104 is again biased to a neutral centered position, illustrated in FIG. 2, by biasing means that consists of a first spring 120 that has one end received into a cup 122 which has an outwardly directed flange 124 on the outer end thereof that is slidable in enlarged portion 112 of bore 102. A second spring 126 is telescoped over a cup 128 that has an outwardly directed flange 130 which is biased into engagement with one side of slave piston 104. Again, a bolt 132 is threaded into end 133 of housing 100 and has a head 134 that is located within cup 128. Thus, springs 120 and 126 define a second biasing means cooperating with piston 104 to maintain the slave piston in a centered neutral position intermediate opposite ends of the slave cylinder 100.

The opposite ends of the respective cylinders 60 and 100 are each interconnected by a conduit 140 and 142. Thus, conduit 140 and the left-hand ends of bores 62 and 102 define a first chamber on one side of pistons 64 and 104 while conduit 142 interconnects the opposite ends of the cylinders to define a second chamber that includes a portion of each of the bores 62 and 102.

An incompressible hydraulic fluid, such as oil, is delivered to the respective chambers from a reservoir 150 through first and second ports 152 and 154. As illustrated in FIG. 2, ports 152 and 154 extend through housing 60 and are positioned to be in close proximity to the opposite sides of master piston 64 when the piston is in the centered neutral position illustrated in FIG. 2 so that both chambers are in communication with the reservoir when the entire system is in the neutral position. Also, reservoir 150 is located above master cylinder and piston assembly 54 and may be integral herewith, to simplify the construction. With this arrangement, the four springs 82, 90, 120 and 126 all act to automatically return both pistons 64 and 102, as well as manual control lever 52 and control arm 50 to the centered, neutral position, whenever the external manual force on the control arm is released. When the control system is in the centered, neutral position, the respective ports 152 and 154 will be in communication with the respective chambers located in opposite sides of the pistons 64 and 104 so that the reservoir is automatically in communication wih both chambers to replenish any fluid that may have been lost due to leakage in the system.

With the system described above, the entire system can readily be operated at atmospheric pressure which again reduces the overall cost of the various components that are necessary for the control system.

As can be appreciated from the above description, whenever manual control lever is moved from from the neutral, centered position, illustrated in FIG. 2, one of the ports will immediately be closed by one of the seals 66 to trap the fluid in the associated chamber. For example, if the manual control lever is moved to the left, as viewed in FIG. 2, port 152 will immediately be closed so that all of the fluid in the left-hand end of bore 62, conduit 140 and the left-hand end of bore 102 is trapped in a sealed compartment. Thus, any further movement of master piston 64 by movement of control lever 52 will result in a transfer of fluid from master cylinder 60 to the left-hand end of slave cylinder 100 and will result in a corresponding movement of slave portion 104 in the opposite direction. During such movement of the slave piston, the fluid in the right-hand end of the slave cylinder is forced through conduit 142 into the right-hand end of master cylinder 60. Since the right-hand end of the master cylinder is evacuating at the same rate as the right-hand end of the slave cylinder is compressing, the fluid can readily be transferred at substantially atmospheric pressure which reduces the forces that are necessary for movement of the respective pistons. Also, as was indicated above, each time the manual control lever 52 is released, all of the springs cooperate to return the respective pistons 64 and 104 to the neutral centered position and both chambers are then in communication with the reservoir 150.

As can be appreciated, the manual control levers 52 are returned to the neutral position many times during the normal operation of a vehicle of this type. This coupled with the fact that the fluid is gravity fed into the respective chambers, insures that both chambers are always filled with the incompressible hydraulic fluid. This eliminates the need for any synchronizing adjustments that heretofore have been necessary for systems of this type. It also makes the system independent of the effects of expansion of fluid due to heat or contraction due to cold.

It is contemplated that the respective cylinders can be mounted in fixed positions with respect to body 12 through the use of bolts extending through openings 160 in the respective cylinders. Such an arrangement requires the elongated slots 74 and 118 to compensate for the angular movement of lever 52 and arm 50 in response to direct rectinlinear motion of piston rods 68 and 108. However, if desired, the respective assemblies 54 and 56 could be pivotally supported on body 12 which would eliminate the need for the elongated slots 74 and 118 or other well known types of flexible joints.

The present invention provides an extremely simple and inexpensive arrangement for interconnecting two members through a fluid connection so that one member is moved in direct response to movement of the other member.

Also, while the resepective centering springs have been shown to be located internally of the respective cylinders, these assemblies could readily be located externally and cooperate with the piston rods 68 and 108, if such arrangement is desired.

What is claimed is:

1. In a skid steer vehicle having a vehicle body with first and second ground engaging members on opposite sides of said body, first and second fluid translating devices connected to the respective ground engaging members for operation in the forward and reverse directions and having an arm movable in opposite directions from a neutral position by a manually actuated lever, and a connection between each arm and lever, each connection comprising a master cylinder having a master piston slidable therein with a direct connection between said master piston and said lever, a slave cylinder having a slave piston slidable therein and connected to said arm, a first conduit connecting one end of said master cylinder to one end of said slave cylinder to define a first hydraulic chamber on one side of said pistons and including a portion of each of said cylinders, a second conduit connecting an opposite end of said master cylinder to an opposite end of said slave cylinder to define a second chamber on an opposite side of said pistons and including a portion of each of said cylinders, first biasing means cooperating with said master piston and normally maintaining said master piston in a centered position intermediate opposite ends of said master cylinder, second biasing means cooperating with said slave piston and normally maintaining said slave piston in a centered position intermediate opposite ends of said slave cylinder, a hydraulic fluid reservoir connected to said master cylinder with said master cylinder having first and second ports in close proximity to opposite sides of said master piston when said piston is in a centered position so that both said chambers are in communication with said reservoir, whereby movement of said control lever in either direction from a neutral position will move said master piston and block one of said ports so that said slave piston is moved as a function of movement of said master piston by transfer of hydraulic fluid between said cylinders and said first and second biasing means will return both pistons to centered positions, when said lever is released, so that both chambers are again in communication with said reservoir.

2. A skid steer vehicle as defined in claim 1, in which the hydraulic fluid in said chambers and said reservoir is at atmospheric pressure when said master piston is in a neutral position.

3. A skid steer vehicle as defined in claim 1, in which said reservoir is located above said master cylinder and said ports are located along an upper portion of said master cylinder so that said hydraulic fluid is gravity fed to said chambers.

4. A skid steer vehicle as defined in claim 1, in which said master piston and cylinder assembly and said slave piston and cylinder assembly are substantially identical in size and configuration.

5. A skid steer vehicle as defined in claim 1, further including stop means cooperating with each piston and limiting the movement of each piston in opposite directions from the centered position.

6. A skid steer vehicle as defined in claim 1, in which each biasing means includes first and second springs in an associated cylinder and engaging opposite sides of an associated piston.

7. A skid steer vehicle as defined in claim 6, in which each biasing means includes first and second cups in the associated cylinder between the respective springs and the associated piston and movable with said piston for engagement with end portions of the cylinder for limiting the extent of movement of said pistons from the centered positions.

* * * * *